Figure 1:
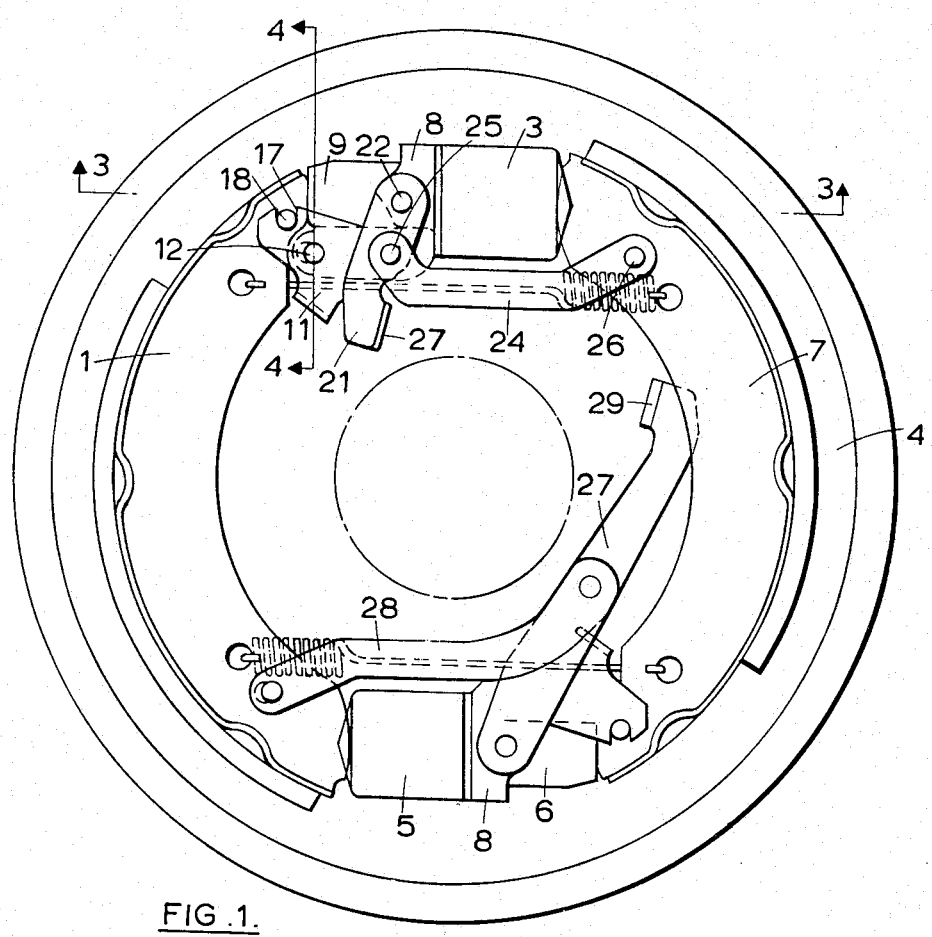

United States Patent
Margetts

[11] 3,913,710
[45] Oct. 21, 1975

[54] SHOE DRUM BRAKES
[75] Inventor: Hugh Grenville Margetts, Leamington Spa, England
[73] Assignee: Girling Limited, Birmingham, England
[22] Filed: July 3, 1974
[21] Appl. No.: 485,610

[30] Foreign Application Priority Data
July 5, 1973 United Kingdom............... 32125/73

[52] U.S. Cl....................... 188/79.5 GE; 188/196 B
[51] Int. Cl.²......................................... F16D 65/58
[58] Field of Search.. 188/79.5 P, 79.5 M, 79.5 GE, 188/79.5 GT, 196 B

[56] References Cited
UNITED STATES PATENTS
| | | | |
|---|---|---|---|
| 2,152,544 | 3/1939 | Field..................... | 188/196 B X |
| 2,168,950 | 8/1939 | Bittner..................... | 188/79.5 GT |
| 2,822,893 | 2/1958 | Flueler..................... | 188/196 B |
| 3,339,678 | 9/1967 | Burnett..................... | 188/196 B X |
| 3,811,537 | 5/1974 | Margetts..................... | 188/79.5 P |

*Primary Examiner*—Duane A. Reger
*Attorney, Agent, or Firm*—Scrivener Parker Scrivener and Clarke

[57] ABSTRACT

Means for adjusting the off position of a shoe in a shoe-drum brake incorporate an angularly movable member which is interposed between the shoe and a stationary part and of which the effective length varies with its angular position, and on application of the brake after wear of the shoe lining has taken the said member is disengaged from toothed locating means and moved angularly, the toothed locating means being re-engaged in a fresh position on release of the brake.

5 Claims, 7 Drawing Figures

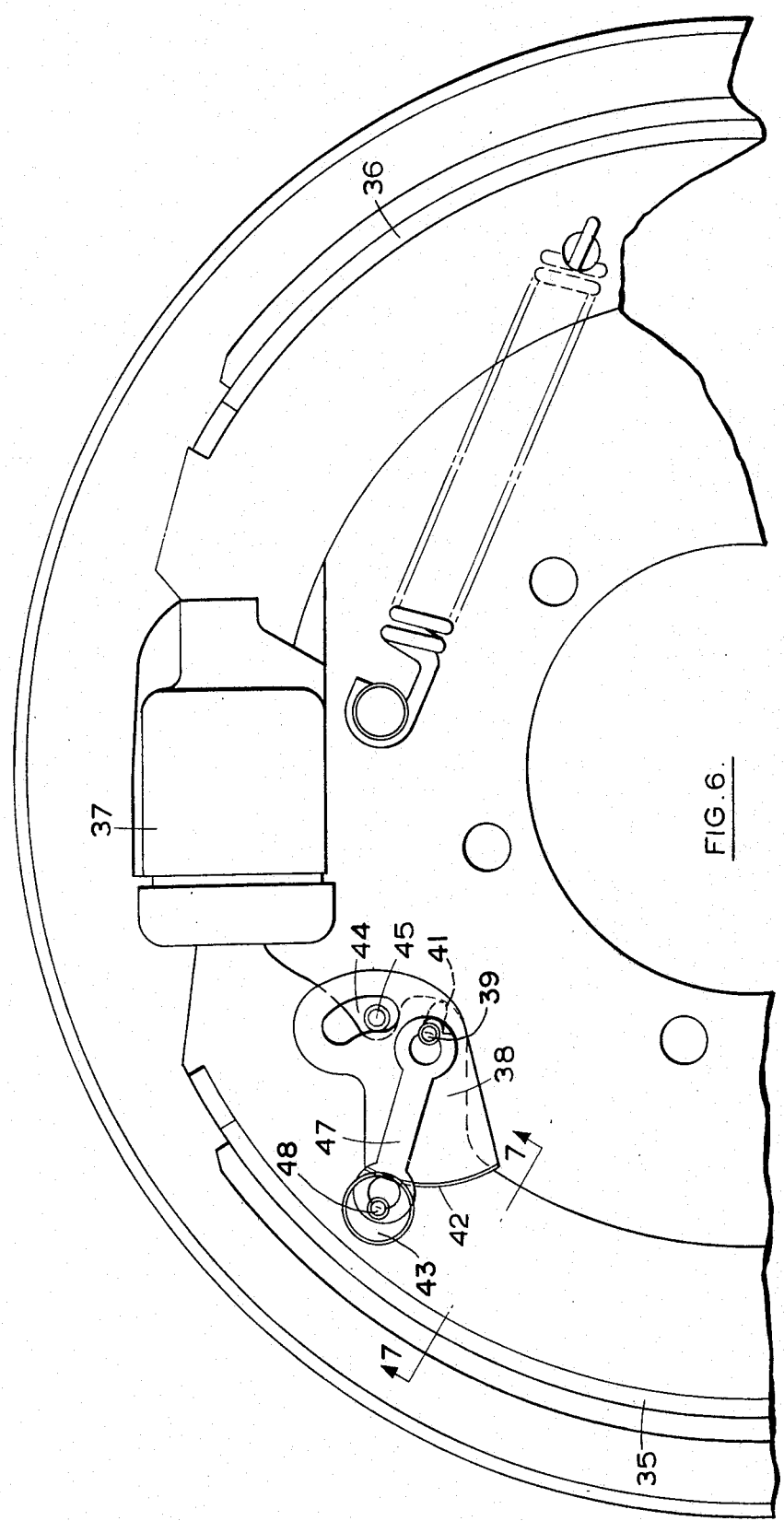

SHOE DRUM BRAKES

This invention relates to improvements in shoe-drum brakes and is more particularly concerned with the adjustment of the shoes to compensate for wear of the shoe linings and with the mechanical actuation from a hand-lever of shoes normally applied hydraulically for service braking.

According to one feature of our invention, in a shoe-drum brake in which a shoe is actuated for service braking by a piston working in an hydraulic cylinder supported on a stationary member of the brake, an adjusting lever is interposed between the shoe and a housing member forming part of or attached to the hydraulic cylinder, and the lever is pivotally mounted on means having a limited movement in an extension of the housing member towards the shoe. At its inner end the lever terminates in an arcuate toothed face or edge co-operating with a complementarily toothed surface on the housing member, and the outer end of the lever engages with the shoe. This engagement is conveniently formed by a peg fixed in the shoe web adjacent to its end and received in a notch in the lever so that as the shoe is applied by an extension of the piston passing through the housing member the lever is rocked through an angle proportional to the displacement of the shoe end.

If wear of the shoe lining has taken place and the angular movement of the lever is greater than the angular spacing of the co-operating teeth on the lever and the housing member, then on release of the brake the lever and shoe will return to fresh adjusted positions.

The toothed surfaces on the lever and the housing member are resiliently biassed into engagement, as for example by a tension or other spring.

In a modification the angular movement of the lever for adjustment purposes may be effected by the piston on application of the brake.

According to another feature of our invention the housing member is axially slidable on the cylinder body, and a lever for applying the brake mechanically is pivoted at one end and passes transversely through the housing member and through a longitudinal slot in the piston extension. A thrust link extends between an intermediate point in the length of the lever and the other brake shoe, and the free end of the lever is adapted for actuation by a hand-brake lever so that both shoes are applied simultaneously.

The slot in the piston allows for hydraulic application of the brake for service braking without affecting the hand-brake.

According to yet another feature of our invention, in a two-leading-shoe brake in which each shoe is actuated at one end, two hand-brake mechanisms are provided, each mechanism incorporating a pivoted lever and a strut so arranged that angular movement of each lever applies a braking force to one shoe through the strut and to the other shoe through the reaction on the lever pivot, the free ends of the levers being connected together for simultaneous actuation so as to produce a two-leading-shoe effect in both directions of rotation of the drum.

The levers of the hand-brake mechanisms may be pivotally mounted on supports slidable on the backplate or other stationary part of the brake, and where each shoe is actuated at one end by a single-ended hydraulic wheel cylinder and fulcrums at the other end on the closed end of the other cylinder the cylinders or parts associated with them may form the supports for the levers of the hand-brake mechanisms.

Figure 2:
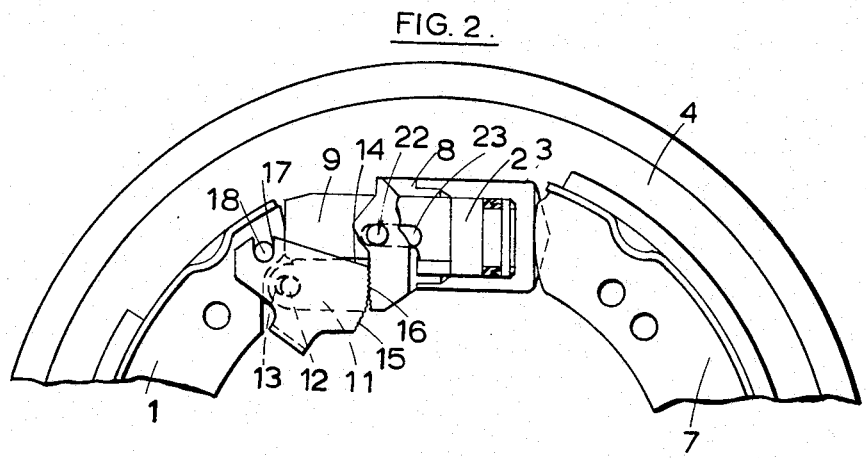
Figure 3:
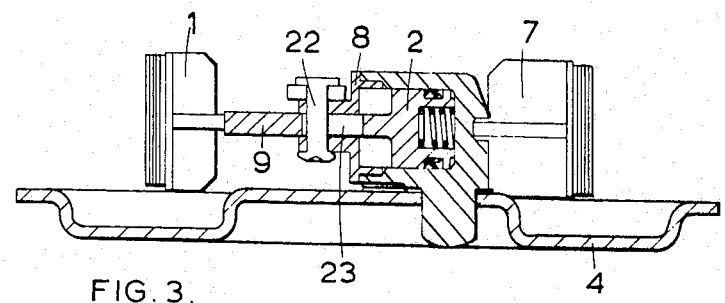
Figure 5:
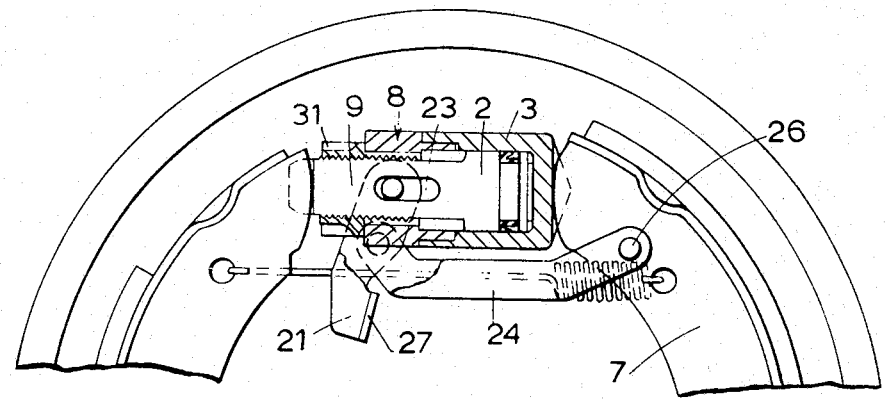
Figure 7:
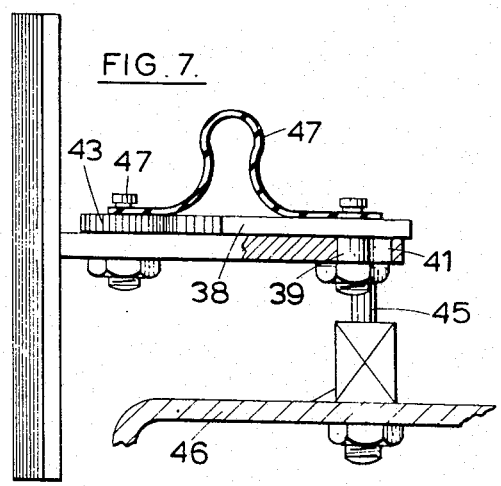
Figure 4:
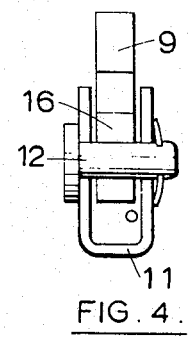

One form of brake embodying our invention and a modification are illustrated by way of example in the accompanying drawings in which:

FIG. 1 is an end elevation of a complete brake,

FIG. 2 is an end elevation of the upper part of FIG. 1 with the hydraulic cylinder in section, FIG. 3 is a section on the line 3—3 of FIG. 1, FIG. 4 is a fragmentary section on the line 4—4 of FIG. 1, FIG. 5 is a view similar to FIG. 2 but showing the same hand-brake operation in conjunction with a manual adjuster, FIG. 6 is an elevation of the upper part of a brake incorporating another form of adjuster, and FIG. 7 is a section on the line 7—7 of FIG. 6.

The shoe-drum brake illustrated in FIGS. 1 to 4 is of the known two-leading shoe type in which one end of the shoe 1 is actuated by a piston 2 working in a single-ended wheel cylinder 3 fixed to the backplate 4 of the brake. The other end of the shoe fulcrums on the closed end of a single-ended wheel cylinder 5 in which works a piston 6 which actuates one end of the shoe 7 of which the other end fulcrums on the closed end of the cylinder 3.

A housing member 8 is slidably mounted over the open end of the cylinder 3, an extension 9 of the piston passing through the member 8 into engagement with the end of the shoe 1. A quadrantal adjusting lever 11 is pivotally mounted on a pin 12 having a limited sliding movement in a slot 13 in an extension 14 of the member 8 towards the shoe. On its inner end the lever 11 terminates in a toothed arcuate edge 15 resiliently urged into engagement with a complementarily toothed surface 16 on the member 8. Adjacent to the outer end of the lever there is a notch 17 in which is engaged a peg 18 fixed in the web of the shoe 1.

When the brake is applied hydraulically for service braking the end of the shoe 1 is moved outwardly of the piston extension 9 and if, owing to wear of the shoe lining, the movement is greater than the clearance between the pin 12 and the slot 13 the lever 11 moves outwardly with the shoe and the teeth 15 on its inner edge are disengaged from the toothed surface 16 on the member 8. The peg 18 on the shoe moves the lever angularly about its pivot through a small angle dependent on the amount of wear of the shoe lining, and on release of the brake the lever takes up a fresh adjusted position in its engagement with the member 8.

An identical automatic adjuster is provided on the wheel cylinder 5 for the adjustment of the shoe 7.

It will be appreciated that an automatic adjuster as described above could be provided at each end of a double-acting wheel cylinder to adjust both shoes of a leading-trailing shoe brake.

For the mechanical application of the brake from a hand-lever a lever 21 is pivotally mounted on a transverse pin 22 fixed in the member 8 and passing through a slot 23 in the piston extension 9.

A thrust link 24 is pivotally connected at one end by a pin 25 to an intermediate point in the length of the lever 21, and the other end of the link is pivotally connected by a pin 26 to the shoe 7.

The free end of the lever 21 is provided with a lug 27 and to apply the brake from a hand-lever a pull is applied to the lug through a cable or other transmission member. The shoe 7 is applied by the link 24 and the reaction on the pivot pin 22 of the lever moves the housing member 8 outwardly. This acts through adjusting lever 11 and pin 18 to apply the brake.

For simultaneously actuating the shoes at their other ends a lever 27 is pivotally mounted on the housing member 8 of the hydraulic cylinder 5, and a link 28 is connected between that lever and the nonactuated end of the shoe 1. The lever 27 is extended upwardly and a lug 29 is provided on its free end. That lug is engaged by the casing of a bowden cable while the cable itself is connected to the lug 27 on the lever 21 so that both levers are rotated in an anticlockwise direction to apply the brake when the hand-brake lever is operated, and both shoes act as leading shoes in both directions of rotation of the brake drum.

The mechanical actuator described above is not essentially tied to use in combination with an automatic adjuster.

FIG. 5 shows a construction in which the hand-brake actuator is the same as in the embodiment shown in FIGS. 1 to 4, but for the adjustment of the shoe 1 the extension 9 of the piston 2 is externally screw-threaded and a nut 31 screwed on to it bears against the outer end of the housing member. The nut is castellated or longitudinally grooved and can be rotated to adjust the shoe by means of a screwdriver or other tool inserted through a sealed hole in the backplate of the brake.

In the modified form of adjuster shown in FIGS. 6 and 7 the brake is again a two-leading shoe brake in which the shoes 35, 36 are each actuated at one end by a single-ended hydraulic cylinder. The shoe 35 is actuated by a piston working in an hydraulic cylinder 37 of which the closed end provides a stationary abutment for the shoe 36.

A strut 38 is pivotally mounted for angular movement about a pin 39 which is fixed in the strut and passes through an elongated hole 41 in the web of the shoe 35.

The outer end of the strut is arcuate and formed with teeth 42 adapted to co-operate with the peripherally knurled disc 43 fixed to the shoe web. An arcuate slot 44 in the strut offset from the pin 15 engages over a post 45 fixed in the stationary back-plate 46 of the brake. The width of the slot 44 is greater than the diameter of the part of the post 45 passing through the slot.

The teeth on the strut are normally held in engagement with the knurled disc 43 by a bowed spring 47 of which one end is attached to a peg 48 which secures the disc 43 to the shoe web and the other end is attached to the pin 39.

When the brake is applied the shoe moves outwardly and takes up the clearance between the post 45 and the slot 44. If, owing to wear of the shoe lining, there is a continued outward movement of the shoe movement of the strut with the shoe is prevented by the post 45, so that there is relative sliding movement between the pin 39 on the strut and the elongated hole 41 in the shoe web and the toothed arcuate outer end of the strut is disengaged from the knurled disc 43. Then owing to the offset disposition of the pin 15 and the post 45 the strut is caused to move angularly and on release of the brake the outer edge of the strut takes up a fresh adjusted position in its engagement with the disc 43.

The shape of the slot 44 is such that angular movement of the strut progressively reduces the distance through which the shoe can return on release of the brake so that wear of the shoe lining is automatically taken up.

I claim:

1. A shoe drum brake incorporating an adjuster for automatically adjusting the off position of a shoe, wherein the shoe is actuated by a piston working in a hydraulic cylinder mounted on the back-plate of the brake, an adjusting lever interposed between the shoe and a housing member associated with the cylinder said housing member having an extension, means pivotally mounting said lever intermediate its ends on said extension and having limited movement in said extension towards the shoe, means connecting the outer end of said lever with said shoe for movement therewith, said lever terminating at its inner end in an arcuate toothed face cooperating with a complementary toothed surface on the housing member, said connecting means of said lever with said shoe being arranged relative to the means pivotally mounting said lever with said housing extension that upon outward movement of said shoe beyond a predetermined value greater than said limited movement permitted by said pivotal mounting means in the application of the brake said connecting means in cooperation with said mounting means effects separation of the respective toothed surfaces while simultaneously moving said lever angularly about said pivotal mounting means whereby on release of the brake the lever and shoe return to new adjusted positions.

2. A shoe-drum brake as claimed in claim 1 wherein the connection between the adjusting lever and the shoe comprises a peg fixed in the shoe adjacent to its actuated end and a notch in the lever in which said peg is received, whereby on application of the shoe the lever is rocked about said pivotal mounting means through an angle proportional to the displacement of the shoe end.

3. A shoe-drum brake as claimed in claim 1 wherein the housing member is slidable axially on the hydraulic cylinder and a second lever is pivotally mounted in the housing member and coupled by a link to the other shoe of the brake said second lever being operable manually for applying both shoes to the brake drum for parking or emergency braking.

4. A shoe-drum brake as claimed in claim 3 wherein both shoes are actuated at both ends by similar hydraulic actuators each incorporating adjusting means and the levers are coupled for simultaneous manual operation to apply both shoes to the brake-drum, the disposition of the levers being such that equal forces are applied to the shoes.

5. A shoe-drum brake incorporating an adjuster for automatically adjusting the off position of a shoe, wherein the shoe is actuated by a piston working in a hydraulic cylinder mounted on the back-plate of the brake, an adjuster strut pivotally mounted on the shoe web by a pin, said web extending through an elongated hole in one of said strut and web and fixed to the other, said strut having a toothed arcuate outer edge, a knurled member fixed to the web for cooperation with said toothed edge of said strut, and a pin fixed to the stationary back plate of the brake and received with clearance in an arcuate slot in the strut, the location and form of the slot being such that if the outward movement of the shoe in the application of the brake exceeds a predetermined value the clearance between the pin and the slot is taken up, the knurled member is disengaged from the strut, and the strut is moved angularly, whereby on release of the brake the return movement of the shoe is reduced to take up wear of the shoe lining.

* * * * *